Jan. 27, 1948. E. W. LEHMAN 2,435,146
FASTENER
Filed Dec. 15, 1944

INVENTOR.
EUGENE W. LEHMAN
BY
ATTORNEY

Patented Jan. 27, 1948

2,435,146

UNITED STATES PATENT OFFICE 2,435,146

FASTENER

Eugene W. Lehman, East Cleveland, Ohio, assignor to The Cleveland Pneumatic Tool Company, Cleveland, Ohio, a corporation of Ohio Application December 15, 1944, Serial No. 568,289

2 Claims. (Cl. 85—5)

1

The present invention relates to a fastener for temporarily holding together perforated plates or sheets in perforate alignment, preparatory to the riveting thereof.

An important object of the invention is to produce a fastener or temporary rivet which may be readily applied to and removed from the work, the temporary rivet being constructed in a manner forming a simple assembly which is strong, durable and efficient.

Another object of the invention is to provide a fastener capable of securing perforated metal sheets together in perfect perforate alignment wherein the parts thereof are united in a manner to preclude separate disengagement thereof should the fastener break while in use or while being applied to the sheets.

A further object of the invention is to provide a temporary fastener wherein there is employed a spreader-like member for maintaining the legs of the fastener out of contact, the fastener being formed so as to permit movement of the legs relative thereto while being held in a unitary assembly.

Other objects and advantages more or less ancillary to the foregoing reside in the specific construction and aggroupment of the elements peculiar to this structure, as will become apparent from a more complete examination of this specification.

In the drawings—

Figure 1:
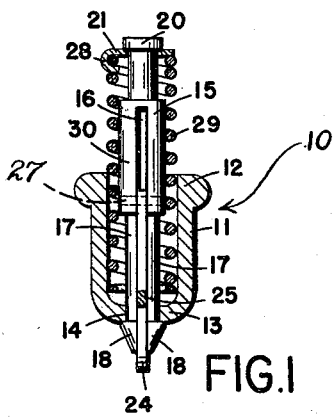
Figure 1 is a vertical sectional view with parts in elevation of the improved fastener.

Referring to the drawing for a more detailed description thereof, the new and improved fastener is generally designated by the reference numeral 10 and comprises a cup-shaped housing 11 formed at its upper end with an external annular flange 12, and having its lower end formed by a cross wall or base 13 with a cylindrical bore 14 extending centrally therethrough.

Slidably mounted within the housing 11 there is a retainer 15 which is preferably formed of a single piece of cylindrical material. This retainer 15 is split throughout a portion of its length, as indicated at 16, to provide a pair of legs 17 which project through the central bore 14. Each leg 17 has its free end provided with a pointed foot

2

18 which forms an outwardly inclined lateral projection 19 for normally engaging the lower face of the base 13, as shown in Figure 1, but is adapted to engage the under side of the work, as will be hereinafter explained. The centralmost portion 30 of the retainer 15 is preferably of a greater diameter than the upper and lower ends thereof, as clearly shown in the drawing, and the upper end is formed with an annular flange 20 which carries a removable clamp 21 having a down turned flange 28.

Resting on the inner face of the base 13 and extending downwardly between the legs 17 there is a spreader generally designated by the reference numeral 22. This spreader comprises a head portion 23 and tail portion 24 which are respectively substantially equal in width to the portion 30 and the legs 17 respectively, as more clearly shown in Figure 5 of the drawing. The spreader 22 further includes cross arms 25 which are maintained in engagement with the inner surface of the base 13 and when so disposed the head and tail portions are held between the legs 17 for preventing inward lateral movement of the feet 18 thereof when the fastener is in sheet clamping engagement.

Figure 5:
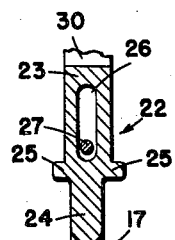
Figure 5 is a sectional view taken substantially on line 5—5 of Figure 2.
Figure 6:
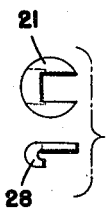
Figure 6 is a top plan view and side elevational view of the collar or cap which is mounted at the upper end of the fastener.

In accordance with the present invention, a means has been provided for uniting the spreader 22 with the legs 17 in a manner to permit relative movement of the legs, yet prevent separation of these parts. As shown in Figure 5 of the drawing, this means comprises an elongated slot 26 formed in the head portion of the spreader and a pin 27 extending transversely therethrough. The pin 27 is carried by the legs 17 and since the retainer 15 is split throughout the major portion of its length, it is readily apparent that movement of the retainer relative to the spreader is permitted through this pin and slot connection. Moreover, the slot 26 is of such a length that for the normal position of the fastener shown in Figure 1 the upper end of the slot is in very close proximity to but not resting on the top of the pin 27. This construction does not interfere with the proper operation of the device, but does serve to prevent the accidental separation of parts from within the housing 11, as will be hereinafter explained.

Interposed between the upper end 20 of the retainer 15 and the cross arms 25 of the spreader 22, there is a compression spring 29. This spring 29 surrounds the retainer 15 and has its upper end locked through the medium of the flange 28, said flange entering between the upper pair of coils of the spring as clearly shown in the drawing. With the spring held in this manner, its accidental removal from the housing is prevented.

The fastener in accordance with the present invention has been primarily designed because of its safety features. It has been determined from past experiences that workmen have been seriously injured by parts of the fastener being thrown out of the housing. This is usually caused by breakage of the feet when the spring is under compression, and the released energy of the expanding spring tends to throw the retainer out of the housing with considerable force. This hazard is substantially eliminated by reason of the spring 29 being locked on the retainer 15 through the down-turned flange 28 and also by reason of the interlocking engagement of the legs 17 and spreader 22.

In the operation of the device, the compression spring 29 active between the clamp 21 and the spreader arms 25 will normally urge the retainer 15 upwardly relative to the housing 11, causing the lateral projections 19 of the feet 18 to normally engage the base 13 as shown in Figure 1. In this instance, it will be understood that inward lateral movement of the feet 18 is prevented by the spreader 22 located therebetween.

Figure 2:
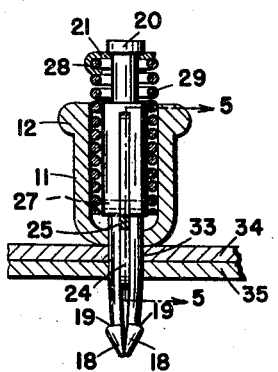
Figure 2 is a view similar to Figure 1 illustrating the position assumed by the fastener during its insertion in the work.
Figure 3:
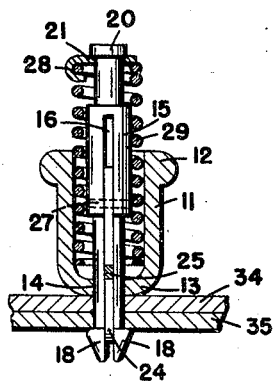
Figure 3 is a similar view illustrating the fastener in operative position.
Figure 4:
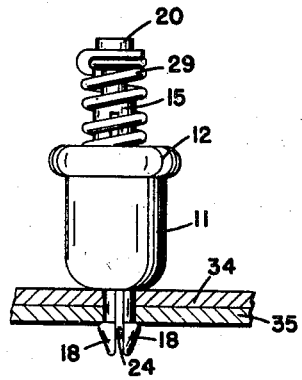
Figure 4 is a side elevational view of the fastener in operative position.

The temporary fastener is applied to or removed from the work by use of a plier-like tool, the construction of which is well known in this art, one jaw of the tool engaging the under side of the annular flange 12 of the housing, and another jaw engaging the flange 20 of the retainer 15. Upon movement of the two jaws toward each other, the retainer 15 will be forced downwardly relative to the housing 11 by compressing the spring 29 and causing longitudinal movement of the feet 18 away from the base 13 and out of operative engagement with the depending portion 24 of the spreader 22. The feet 18 are then free to be inserted through the aligned perforations 33 of the pair of sheets 34 and 35, as shown in Figure 2 of the drawing. It is to be understood that the legs 17 are formed of a material having a certain degree of resiliency and shaped to cause the feet 18 to spring toward each other when out of engagement with the spreader 22. The feet 18 when in the position shown in Figure 2 are of a diameter smaller than the sheet perforations 33. When the fastener is in the position shown in Figure 2 and the pressure exerted on the annular flange 12 and the flange 20 is released, the retainer 15, due to the action of the compression spring 29, will again be urged upwardly relative to the housing 11, causing the feet 18 of said retainer to be separated or moved laterally away from each other by the spreader tail portion 24. This will cause the lateral projections 19 to engage the under side of the lower sheet 35 for clamping the work between the feet 18 and the base 13. It is understood that the compression spring 29 is sufficiently strong to hold the sheets 34 and 35 tightly clamped and therefore against relative movement. This position of the fastener is shown in Figures 3 and 4 of the drawing.

When it is desired to remove the fastener from the work, pressure through the plier-like tool may again be exerted on the fastener to compress the spring, as shown in Figure 2, in which instance the feet 18 will again spring toward each other to enable their withdrawal through the perforations 33. This removal of the retainer, should the retainer not be maintained perfectly coaxial with the perforations 33, is facilitated by the outwardly inclined projections 19 of the feet 18 simply sliding off the lower edge of the perforation of the lowermost sheet.

From the above description when taken in connection with the accompanying drawings, it is thought to be readily apparent that there has been provided a fastener for temporarily retaining perforated sheets in perforate alignment wherein the compression spring is confined within predetermind limits on the retainer, and the legs and spreader are held in a united assembly. Should breakage occur at the feet 18 or the tail portion 24 when the fastener spring is under compression, the spring will be permitted to expand, drawing the legs 17 upward through the bore 14, until the relative position of the parts as shown in Figure 1 will be reached. Directly thereafter the rising pin 27 will make contact with the end of the slot 26 in the spreader 22 and will threby prevent further expansion of the spring 29 which remains locked between the clamp 21 and the spreader arms 25, thus precluding any possibility of the retainer or spring flying out of the housing with sufficient force to injure a workman. In fact, there is very little possibility of either the spring or the retainer becoming detached from the housing or being thrown therefrom at all.

Although the foregoing description is necessarily of a detailed character, in order to completely set forth the invention, it is to be understood that the specific terminology is not intended to be restrictive or confining and it is to be further understood that various rearrangements of parts and modifications of structural details may be resorted to without departing from the scope or spirit of the invention as herein claimed.

I claim:

1. In a sheet holder, a cup-shaped housing, the base of said housing having a central bore therethrough, a retainer having two laterally resilient legs extending through said bore, outwardly extending projections on said legs, a spreader having lateral arms resting on said base, a spring surrounding said retainer, means on the upper end of said retainer engaging said spring, the lower end of said spring engaging said spreader arms, said spreader having a longitudinal slot therein, and means fixed in at least one of said legs extending into said slot, whereby said spreader prevents accidental release of said retainer in event of failure of said retainer legs.

2. In a sheet holder, a cup-shaped housing, the base of said housing having a central bore therethrough, a retainer having two laterally resilient legs extending through said bore, outwardly extending projections on said legs, a spreader having lateral arms resting on said base, a spring surrounding said retainer, means on the upper end of said retainer engaging said spring, the lower end of said spring engaging said spreader arms, said spreader having a longitudinal slot therein, and a pin mounted in said legs and extending transversely through said slot, whereby said spreader prevents accidental release of said retainer in the event of failure of said retainer legs.

EUGENE W. LEHMAN.

REFERENCES CITED

The following references are of record in the file of this patent:

UNITED STATES PATENTS

| Number | Name | Date |
|---|---|---|
| 2,301,347 | Wallace | Nov. 10, 1942 |
| 2,371,470 | Rossmann | Mar. 13, 1945 |
| 2,379,134 | DeMooy | Jun. 26, 1945 |